United States Patent
Choi et al.

(10) Patent No.: US 8,550,355 B2
(45) Date of Patent: Oct. 8, 2013

(54) ANTI-CONDENSATION OPTICAL DEVICE

(75) Inventors: Jaeho Choi, Whitestone, NY (US); Eduard Kogan, Howard Beach, NY (US); Carl Thelemann, East Islip, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1754 days.

(21) Appl. No.: 11/172,174

(22) Filed: Jun. 30, 2005

(65) Prior Publication Data

US 2007/0002442 A1    Jan. 4, 2007

(51) Int. Cl.
*G06K 7/10*    (2006.01)

(52) U.S. Cl.
USPC ............................... 235/472.01; 235/462.15

(58) Field of Classification Search
USPC ................. 235/472.01, 472, 462.01, 472.02; 359/507, 513; 396/25, 28, 29
See application file for complete search history.

(56) References Cited

U.S. PATENT DOCUMENTS

| | | | | |
|---|---|---|---|---|
| 5,042,821 A | * | 8/1991 | Bontly | 359/513 |
| 5,729,003 A | * | 3/1998 | Briggs, III | 235/462.07 |
| 6,202,877 B1 | * | 3/2001 | La Torre et al. | 220/254.1 |
| 6,612,493 B1 | * | 9/2003 | DeGiovine et al. | 235/462.01 |
| 7,059,530 B2 | * | 6/2006 | Gagne et al. | 235/462.45 |
| 2005/0036748 A1 | * | 2/2005 | Freeman et al. | 385/94 |

* cited by examiner

*Primary Examiner* — Daniel St. Cyr (74) *Attorney, Agent, or Firm* — Randi L. Karpinia; Michael J. Giannetta (57) ABSTRACT

An anti-condensation arrangement for an optical apparatus including a window mounted in a housing comprises an isolating member sealed around an end of an image collecting device of the optical apparatus and around a perimeter of the window, the isolating member substantially preventing airflow between a portion of the housing surrounding the isolating member and a space enclosed by the isolating member.

15 Claims, 7 Drawing Sheets

ANTI-CONDENSATION OPTICAL DEVICE

BACKGROUND

Optical devices such as scanners and imagers are relied on for business and personal use in a wide variety of applications. Many of these devices are used in a variety of environments where rapid changes in temperature and humidity are common.

As would be understood by those skilled in the art, a rapid change in the temperature of the air within the housing of such a device can cause condensation to build up on an optical window of the device, interfering with operation. Although, condensation on an outer surface of the window can be wiped away, condensation within the housing is a more difficult problem to address.

SUMMARY OF THE INVENTION

The present invention is directed to an anti-condensation arrangement for an optical apparatus including a window mounted in a housing, the anti-condensation arrangement comprising an isolating member sealed around an end of an image collecting device of the optical apparatus and around a perimeter of the window, the isolating member substantially preventing airflow between a portion of the housing surrounding the isolating member and a space enclosed by the isolating member.

The present invention is further directed to an apparatus for controlling airflow within a housing including an image capturing device and a window through which light is transmitted between the image capturing device and an outside of the housing. The apparatus comprises a first sealing surface sealingly engaging a perimeter of the image capturing device, a second sealing surface sealingly engaging a perimeter of the window and a wall separating a space between the first and second sealing surfaces from a remainder of a space within the housing, the wall substantially preventing air flow between an outside thereof and the space enclosed thereby.

DETAILED DESCRIPTION

The present invention may be further understood with reference to the following description and the appended drawings, wherein like elements are referred to with the same reference numerals. The present invention will be described in regard to an anti-condensation arrangement for a laser scanning device and a digital imaging device. However, those skilled in the art will understand that these devices are exemplary only and that the anti-condensation arrangement according to the present invention may be applied to any device with a window.

Figure 1:
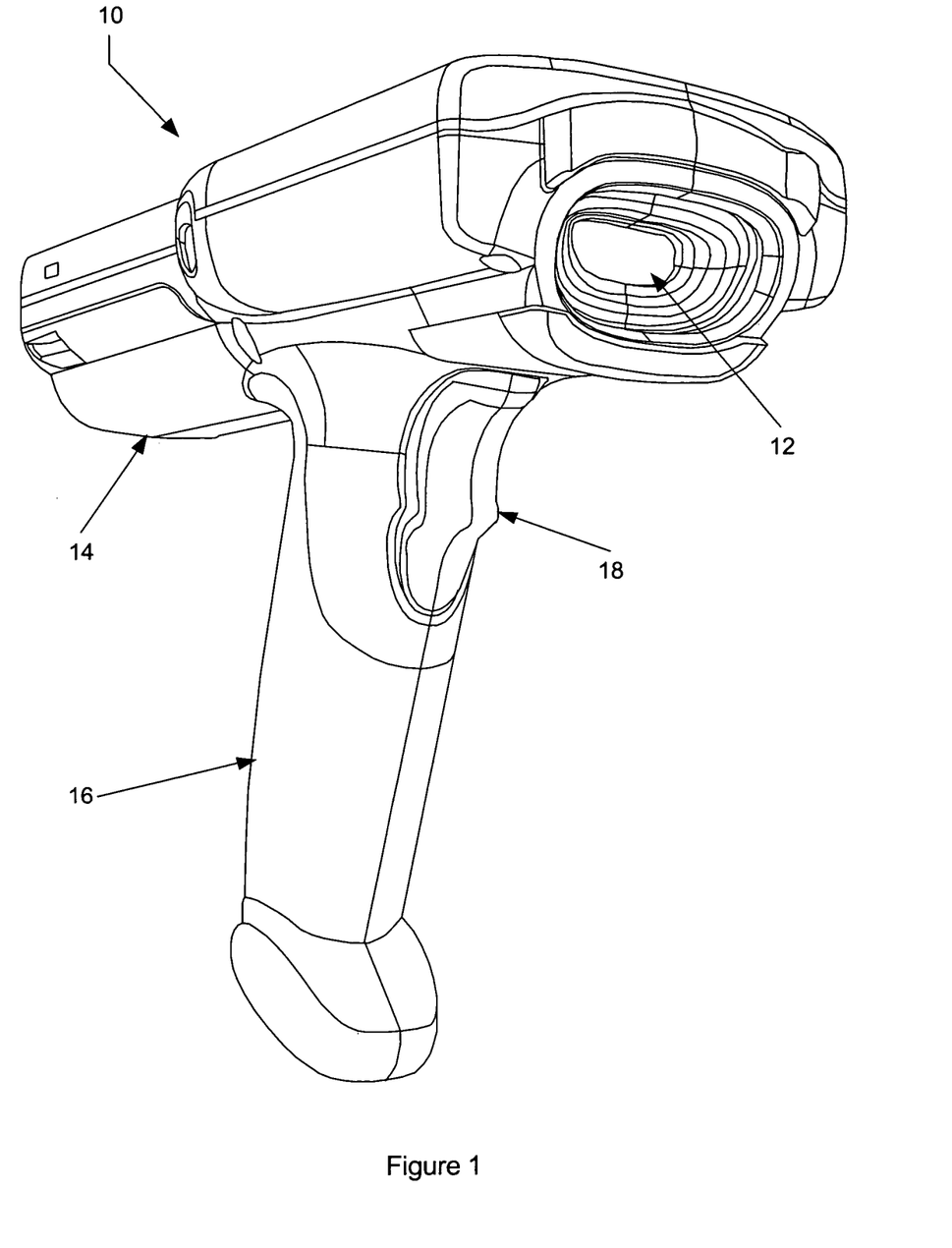
FIG. 1 shows a perspective view of a mobile device including an anti-condensation arrangement according to a first embodiment of the present invention.
Figure 2:
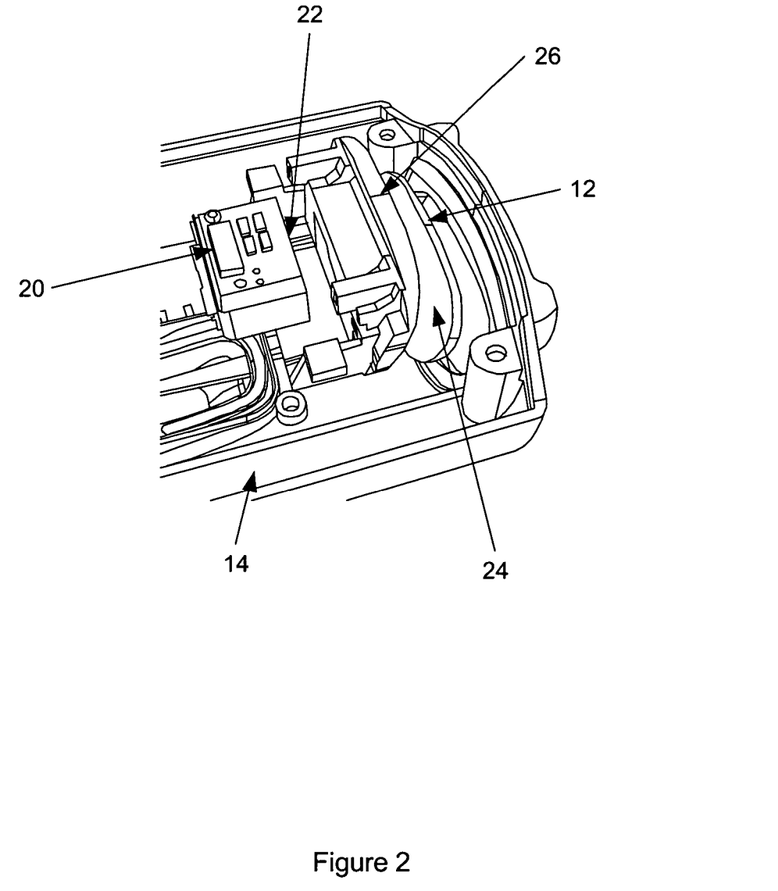
FIG. 2 shows a perspective view of the device of FIG. 1 with a top of a housing thereof removed to show the anti-condensation arrangement according to the first embodiment of the invention.

As shown in FIGS. 1-4, an optical device 10 which in this embodiment is a bar code scanner, includes a window 12 mounted in a housing 14 which includes, for example, a pistol grip 16 and a scanning actuator 18. As shown in FIG. 2, a known scanning engine 20 is mounted within the housing 14 along with supporting electronics, a battery, etc. As would be understood by those skilled in the art, the position of the scanning engine 20 relative to the window 12 is determined based on properties of the scanning engine 20, the window 12 and the desired functionality of the device 10. Specifically, the device 10 is constructed in a manner similar to known optical devices (with the exception of the anti-condensation arrangement described below) with optical properties of the window 12 and the scanning engine 20 dictating an optimal distance between a forward end 22 of the scanning engine 20 and an inner face of the window 12 and, consequently, determining the size of a space 24 within the housing forward of the forward end 22 of the scanning engine 20.

An anti-condensation arrangement of the optical device 10 according to the present invention includes a baffle 26 which extends around the forward end 22 of the scanning engine 20 and encloses a portion of the space 24 including a line of sight for a laser or other light source of the scanning engine 20 and for light returning to the scanning engine 20 after reflection from a target. The baffle 26 seals around the forward end 22 of the scanning engine 20 to isolate the enclosed portion of the space 24 from the balance of the space 24 and from the interior space within the housing 14. This reduces air flow between the enclosed portion of the space 24 and all other areas within the housing 14 except for such air flow as passes through the scanning engine 20 to the enclosed portion of the space 24.

Figure 3:
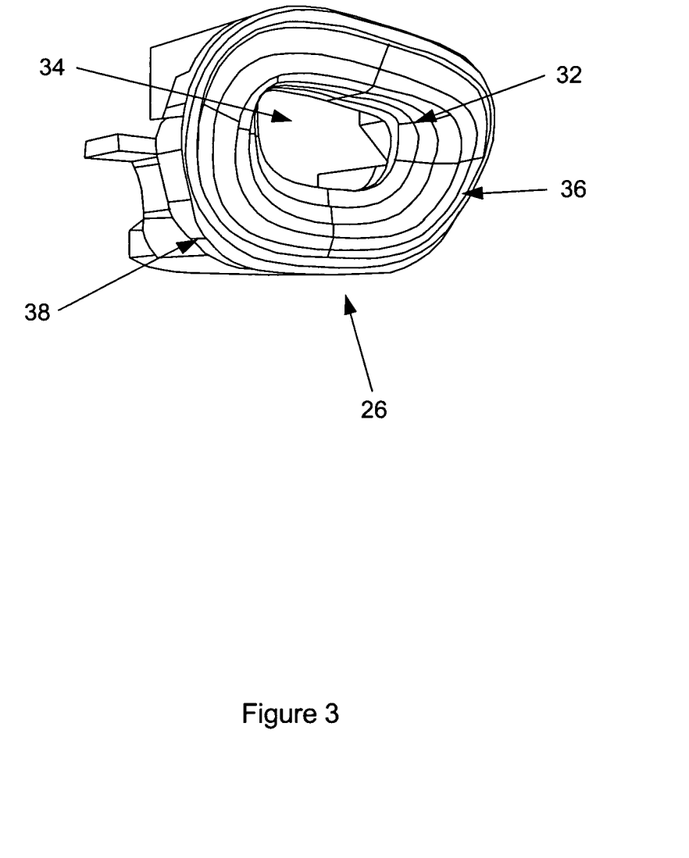
FIG. 3 shows a perspective view of a front of an anti-condensation baffle of the anti-condensation arrangement of FIG. 2.
Figure 4:
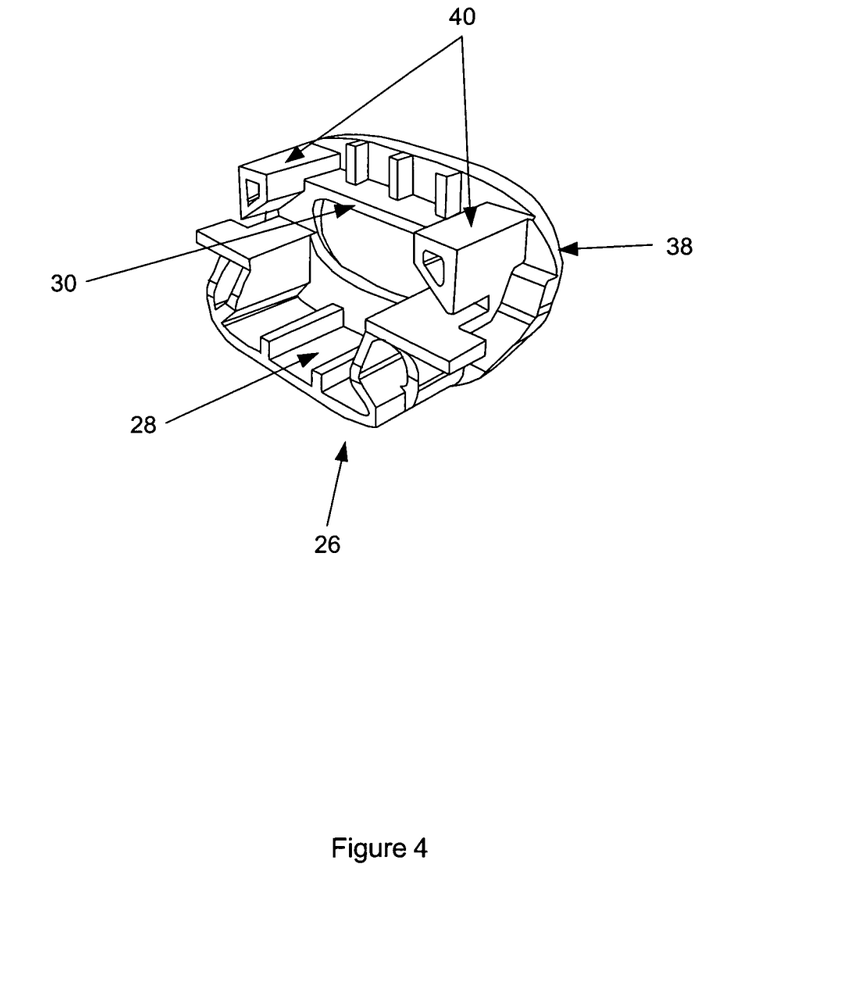
FIG. 4 shows a perspective view of a back of the anti-condensation baffle of FIG. 3.

Specifically, as shown in FIG. 4, a rearward facing portion of the baffle 26 includes a recess 28 which receives the forward end 22 of the scanning engine 20 with a sealing lip 30 sealingly engaging a perimeter of the forward end 22 of the scanning engine 20. A forward end of the baffle 26, as shown in FIGS. 3 and 4, includes a window receiving recess 32 with an optical opening 34 formed therein. A sealing lip 36 extends around a perimeter of the opening 34 to sealingly engage an inner perimeter of the window 12, pressing an outer perimeter of the window 12 against the perimeter of an optical opening in the housing 14.

A wall 38 of the baffle 26 is preferably substantially continuous so that air flow to and from the enclosed portion of the space 24 through the wall 38 is substantially prevented. Of course, those skilled in the art will understand that the term continuous, in regard to this surface, is meant only with regard to the ability of air to pass therethrough and is not intended to limit the shape of the baffle 26 or any part thereof. Rather, the baffle 26 may be formed in any shape dictated by the shape and size of the housing 14 and the components to be included therein. In a preferred embodiment, the sealing lip 30 is joined to the forward end 22 of the scanning engine 20 to form an air-tight seal therewith while the sealing lip 36 forms an air-tight seal with the inner perimeter of the window 12. As described above, this limits air flow between the enclosed portion of the space 24 and the rest of the interior of the housing 14 to air-flow passing to and from the enclosed portion of space 24 through the forward end 22 of the scanning engine 20. However, those skilled in the art will understand that the baffle 26 need not completely seal the enclosed portion of the space 24. Rather, to reduce condensation, the baffle need only restrict air flow to and from this enclosed portion of the space 24 to attenuate temperature fluctuations within the enclosed portion of the space 24.

The baffle 26 is preferably formed of a compressible material which will, for example, absorb the force of any impact to the front of the device 10 and attenuate this force before it reaches the scanning engine 20. In a preferred embodiment of the invention, the baffle 26 is formed of GLS Versollan OM 1262NX available from GLS Corporation. As would be understood by those skilled in the art, the baffle 26 may be formed of any suitable rubber or foam material which exhibits the desired shock absorbing properties and which provides a desired level of impenetrability to air.

As would be understood by those skilled in the art, the baffle 26 includes mounting features 40 which engage corresponding shapes of the engine mounting features to maintain the baffle 26 and the scanning engine 20 in desired positions relative to one another and to the housing 14. Alternatively, the baffle 26 may be maintained in the desired position by a friction fit within the housing 14 and/or through engagement with the forward end 22 of the scanning engine 20.

As described above, rapid changes in the temperature of the air within the housing of an optical device can cause condensation to build up on a window of the device. However, with the device 10, the air in the enclosed portion of the space 24 between the forward end 22 of the scanning engine 20 and the window 12 is substantially isolated from the air in the rest of the interior of the housing 14. Thus, the temperature of the air in the enclosed portion of the space 24 varies more slowly than that in the rest of the housing 14 and, as air is interchanged with this enclosed portion of the space 24 only by passing through the scanning engine 20, the temperature change of the air within the enclosed portion of the space is further attenuated by exposure to the warmth emanating from the scanning engine 20. By slowing the rate of temperature change of the air within the enclosed portion of the space 24 and reducing the overall volume of air in contact with the window 12 and, thereby reducing the volume of water in that air, the anti-condensation arrangement of the present invention reduces the build up of condensation on the inner surface of the window 12, enhancing the operation of the device 10.

Figure 5:
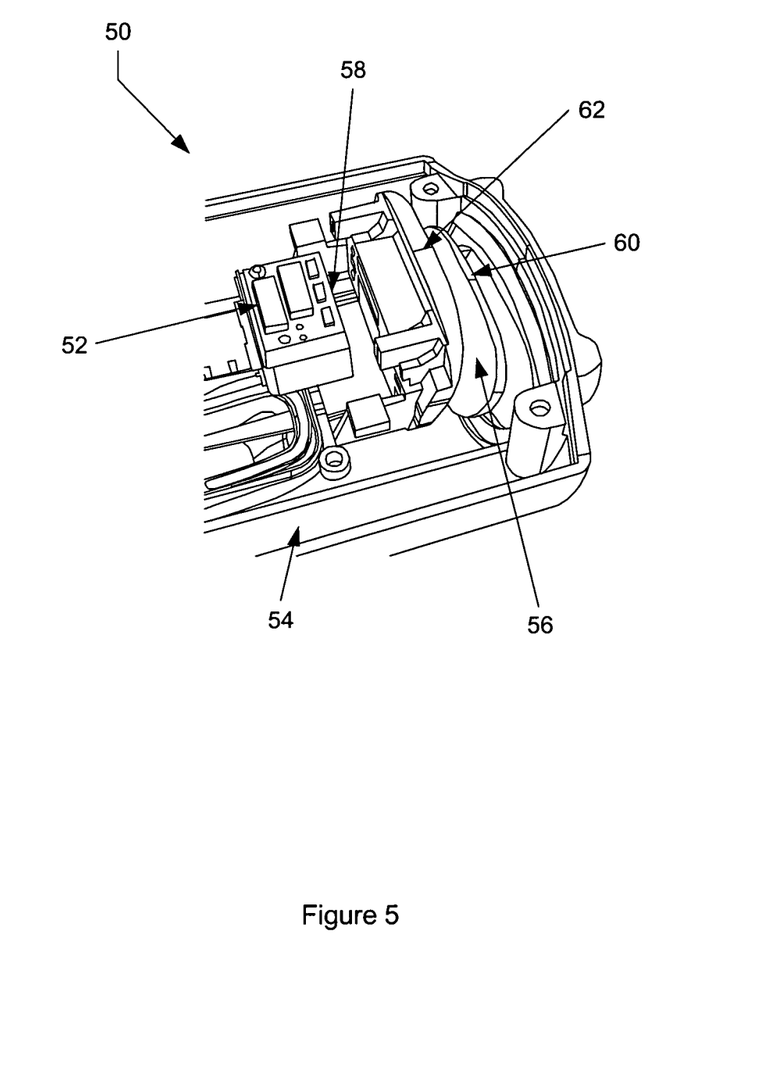
FIG. 5 shows a perspective view of a mobile device including an anti-condensation arrangement with a top of a housing thereof removed to show the anti-condensation arrangement according to a second embodiment of the invention.
Figure 6:
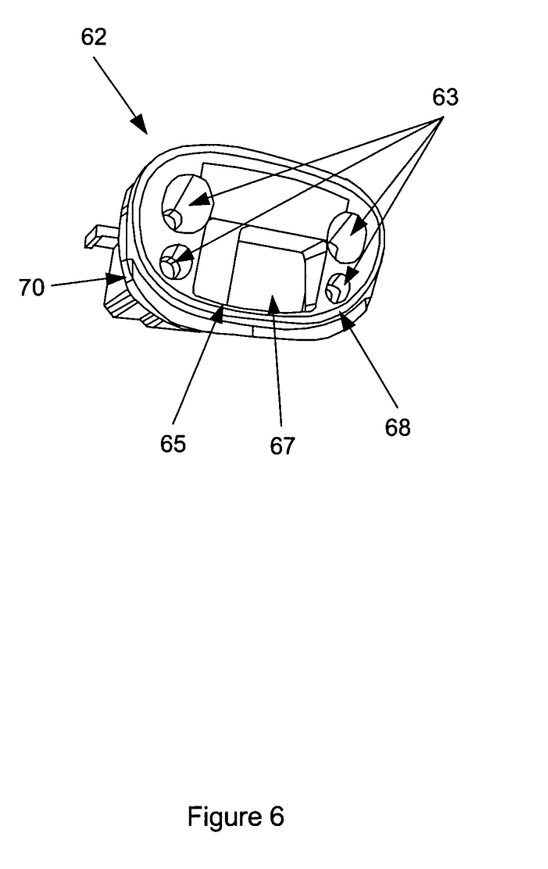
FIG. 6 shows a perspective view of a front of an anti-condensation baffle of the anti-condensation arrangement of FIG. 5.
Figure 7:
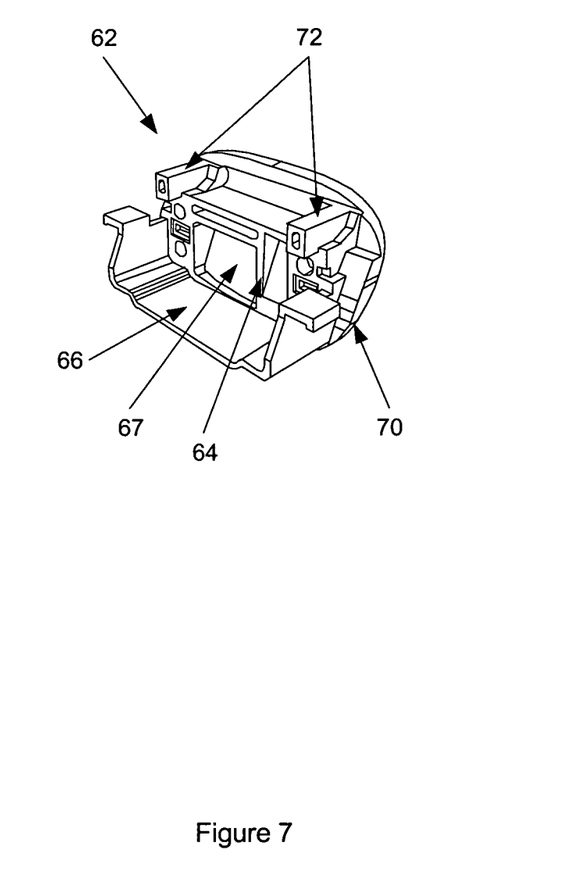
FIG. 7 shows a perspective view of a back of the anti-condensation baffle of FIG. 6.

An optical device 50 according to a second embodiment of the invention is shown in FIGS. 5-7. The device 50 is, for example, an imager (e.g., a digital camera), with an imaging unit 52 mounted within a housing 54 in a manner similar to that described above for the scanning engine 20. However, those skilled in the art will understand that the size of a space 56 between a forward end 58 of the imaging unit 52 and a window 60 of the device 50 may be smaller than the space 24 of the device 10 (i.e., the distance required between the window 60 and the forward end 58 is often less than that required for scanners). Those skilled in the art will understand that these distances may vary significantly depending on the components and desired characteristics of these devices.

The device 50 includes an anti-condensation arrangement including a baffle 62 which encloses a portion of the space 56 between the forward end 58 of the imaging unit 52 and the window 60. Similarly to the anti-condensation arrangement of the device 10 described above, the anti-condensation arrangement of the device 50 substantially prevents air flow between the enclosed portion of the space 56 and the rest of the housing 54 except for air which flows through the imaging unit 52.

As shown in FIG. 7, a rearward facing portion of the baffle 62 includes a recess 66 in which the forward end 58 of the imaging unit 52 is received with a sealing lip 64 sealingly engaging a perimeter of the forward end 58. In addition, as shown in FIG. 6, a forward end of the baffle 62 includes a plurality of openings 63 to accommodate illumination LED's as would be understood by those skilled in the art. In addition, a window receiving recess 65 is formed in the baffle 62 with an optical opening 67 formed therein. A sealing lip 68 extends around a perimeter of the opening 67 to sealingly engage an inner perimeter of the window 60, pressing an outer perimeter of the window 60 against the perimeter of a window receiving opening in the housing 54.

As with the baffle 26, a wall 70 of the baffle 62 is preferably substantially continuous so that air flow to and from the enclosed portion of the space 56 is substantially prevented. As described above, the term continuous, in regard to this surface, is meant only with regard to the ability of air to pass therethrough and is not intended to limit the shape of the baffle 62 or any part thereof. The baffle 62 may also be formed in any shape dictated by the shape and size of the housing 54 and the components to be included therein. In a preferred embodiment, the sealing lip 64 is joined to the forward end 58 of the imaging unit 52 to form a substantially air-tight seal therewith while the sealing lip 68 forms an air-tight seal with the inner perimeter of the window 60. As described above, this limits air flow between the enclosed portion of the space 56 and the rest of the interior of the housing 54 to air-flow passing to and from the enclosed portion of space 56 through the forward end 58 of the imaging unit 52. For example, the baffle 26 preferably restricts air flow into the enclosed portion of the space 24 by at least 80% as compared to a device without such a baffle while the baffle 62 restricts air flow to the enclosed portion of the space 56 by at least 90% as compared to a device without such a baffle. As would be understood by those skilled in the art, the difference in the restriction of air flow seen with the baffles 26 and 62 is substantially entirely due to difference in air flow through a scanning engine and a digital imager.

Similarly to the baffle 26, the baffle 62 is preferably formed of a compressible material such as, for example, GLS Versaflex, which will, for example, absorb the force of any impact to the front of the device 50 and attenuate this force before it reaches the imaging unit 52.

The baffle 62 includes mounting features 72 which engage corresponding shapes of the engine mounting features to maintain the baffle 62 and the imaging unit 52 in desired positions relative to one another and to the housing 54.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. An anti-condensation arrangement for an optical apparatus comprising:
   a housing;
   a window mounted in the housing;
   an image collecting device; and
   an isolating member having a first end sealed to a perimeter of an end of the image collecting device and having a second end sealed to a perimeter of the window to form an airtight seal between the image collecting device and the window, the isolating member substantially preventing airflow between a portion of the housing surrounding the isolating member and a space enclosed by the isolating member.

2. The anti-condensation arrangement of claim 1, wherein the space enclosed by the isolating member includes an optical path between the end of the image collecting device and the window.

3. The anti-condensation arrangement of claim 1, wherein the isolating member permits airflow between the space enclosed thereby and all other portions of the interior of the housing only through the image collecting device.

4. The anti-condensation arrangement of claim 1, wherein the isolating member is formed of a compressible material.

5. The anti-condensation arrangement of claim 4, wherein the compressible material is a rubber.

6. The anti-condensation arrangement of claim 4, wherein the compressible material is GLS Versollan OM 1262NX.

7. The anti-condensation arrangement of claim 1, wherein the image collecting device includes a scanning engine and wherein the isolating member is a baffle sealingly engaging the perimeter of the end thereof and sealingly engaging a perimeter of the window.

8. The anti-condensation arrangement of claim 7, wherein the isolating member restricts air flow to the space enclosed by the isolating member by at least 90%.

9. The anti-condensation arrangement of claim 1, wherein the image collecting device includes a digital imager and wherein the isolating member is a baffle sealingly engaging the end thereof and sealingly engaging a perimeter of the window.

10. The anti-condensation arrangement of claim 9, wherein the isolating member restricts airflow to the space enclosed by the isolating member by at least 80%.

11. An apparatus for controlling airflow within a housing including an image capturing device and a window through which light is transmitted between the image capturing device and an outside of the housing, the apparatus comprising:
a first sealing surface sealingly engaging a perimeter of an end of the image capturing device;
a second sealing surface sealingly engaging a perimeter of the window; and
a wall separating a space between the first and second sealing surfaces from a remainder of a space within the housing to form an airtight seal between the image collecting device and the window, the wall substantially preventing air flow between the remainder of the space within the housing and a space enclosed by the first and second sealing surfaces.

12. The apparatus of claim 11, wherein air flow between the space enclosed by the wall and the remainder of the space within the housing is permitted only through the image capturing device.

13. An anti-condensation arrangement for an optical apparatus including a window mounted in a housing, the anti-condensation apparatus comprising:
an isolating member comprising:
a first arrangement to sealingly engage a perimeter of an end of an image collecting device;
a second arrangement to sealingly engage an inner perimeter of the window; and
a continuous wall to enclose a portion of the housing to form an airtight seal between the image collecting device and the window, the isolating member substantially preventing airflow between a portion of the housing surrounding the isolating member and the portion of the housing enclosed by the continuous wall of the isolating member.

14. The anti-condensation apparatus of claim 13, wherein the first arrangement comprises a recess to receive the end of the image collecting device, and a sealing lip to sealingly engage the perimeter of the end of the image collecting device.

15. The anti-condensation arrangement of claim 13, wherein the second arrangement comprises a window receiving recess with a first optical opening, and further comprises a sealing lip that extends around perimeter of the first optical opening to sealingly engage an inner perimeter of the window, the sealing lip pressing an outer perimeter of the window against a perimeter of an optical opening in the housing.

* * * * *